Aug. 11, 1964    J. R. FITZPATRICK    3,144,045
INTERNAL COUNTERBALANCED CHECK VALVE
Filed May 23, 1963    2 Sheets-Sheet 1

INVENTOR.
John R. Fitzpatrick
BY William S. Dorman
ATTORNEY

Aug. 11, 1964   J. R. FITZPATRICK   3,144,045
INTERNAL COUNTERBALANCED CHECK VALVE
Filed May 23, 1963   2 Sheets-Sheet 2
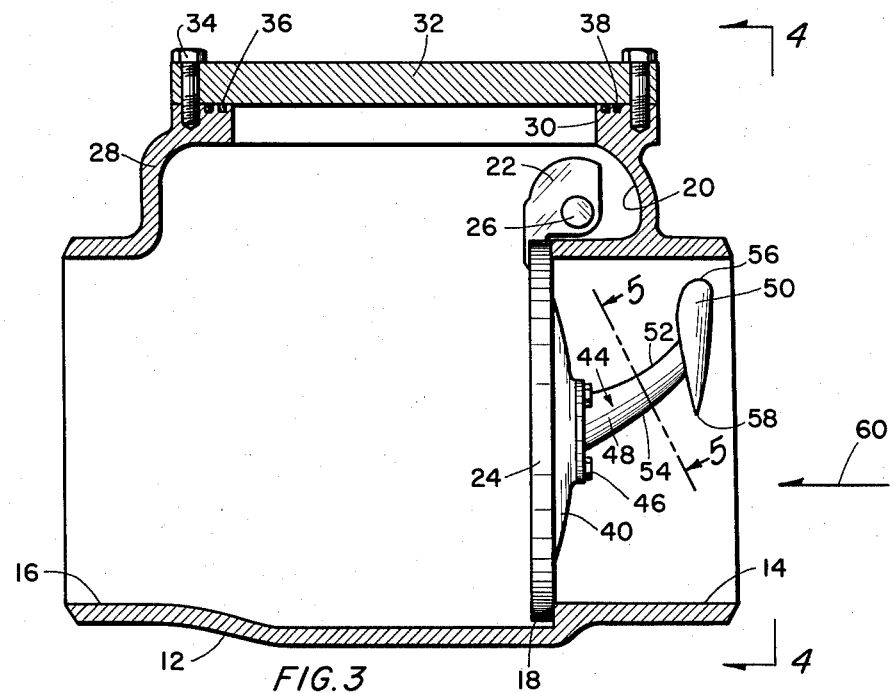
FIG. 3
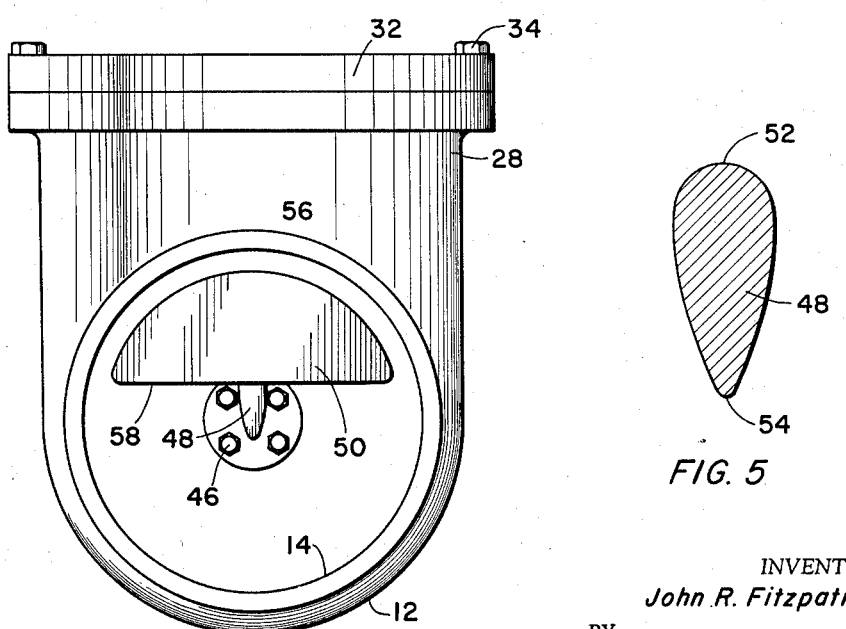
FIG. 4
FIG. 5
INVENTOR.
John R. Fitzpatrick
BY William S. Dorman
ATTORNEY

United States Patent Office 3,144,045
Patented Aug. 11, 1964

3,144,045
INTERNAL COUNTERBALANCED CHECK VALVE
John R. Fitzpatrick, Tulsa, Okla., assignor to Charles Wheatley Company, Tulsa, Okla., a corporation of Oklahoma
Filed May 23, 1963, Ser. No. 282,652
7 Claims. (Cl. 137—527.8)

This invention relates to improvement in check valves and more particularly, but not by way of limitation, to a check valve having an internal counterbalanced device for reducing the effective weight of the closure member to decrease the pressure drop in the fluid flowing through the valve.

Check valves are in wide spread use today in flow line systems wherein it is desired to permit flow of fluid in one direction only therethrough. The closure member or clapper is usually freely pivoted within the valve body for opening in one direction only when the pressure in the flow line is sufficiently great for overcoming the weight of the clapper member. Of course, when the pressure of the fluid drops to a point below that required for opening of the closure member, the clapper will fall by gravity to a closed position.

It is well known that there is usually a pressure drop in the flow stream moving through a check valve. The problem of pressure drop is considered critical in low pressure systems and particularly on the suction side of pumps, and the like. This is due to the fact that there is usually relatively small pressure head on the suction side of a pump and in many instances, the pump is sensitive to pressure drops of a few inches. In some cases a pump will cavitate when the pressure drop is great enough that the fluid is not forced or flooded into the suction side of the pump. As a practical example, many pumps are now buried as much as twenty-eight feet in the ground in order to attain a sufficient pressure head on the suction side thereof to assure efficient operation of the pump. Of course, this means the fluid must be pumped back up through a distance of twenty-eight feet and the disadvantages of burying these pumps at such great depths will be evident.

The critical pressure drop in low pressure systems has long been a problem in the industry and since it is a well known fact that there is a pressure drop in the fluid moving through a check valve, certain standards have been established for reducing the pressure drop. It has been generally considered that the size of the valve is the determining factor in the pressure drop therethrough, and as a result it is usually recommended that the valve selected should be of a size as determined by available reference guides and tables in accordance with the installation or operational requirements thereof. For example, it is apparently an accepted theory that if the valve selected is too large the closure member may float in a partially opened position which results in fluttering of the clapper member and rapid wear of valve parts. Conversely, if the selected valve is too small for the particular service conditions, it is considered that pressure drop through the valve will be excessive.

Upon testing of pressure drop through various check valves, considerable investigation was done, including the testing of valves of varying structures. Whereas heretofore, it has been considered that pressure drop through the check valve was related to the size of the valve, an analysis of the present test results has led to the conclusion that the actual recognition of the cause of the problem has apparently been eluding the industry. During these tests it was discovered that the pressure or force of the fluid stream which is required to open the clapper in a check valve is apparently the main factor creating a pressure drop through the valve. The analysis of the test results indicated that the weight of the clapper member in the check valve is directly related to the pressure drop through the valve, and it was found that the lighter the weight of the closure member the less pressure drop through the valve. In other words, valves of substantially equal dimensions, but having clapper members of lighter weight did not produce as great a pressure drop therethrough as that in a corresponding valve having a heavier clapper member. Thus, a new insight was developed through recognition of the actual problem involved.

Consequently, upon the realization of the apparent actual circumstances surrounding the problem of pressure drop through a check valve, the present invention relates to an internally counterbalanced check valve wherein the effective weight of the clapper member is greatly reduced. A counterbalance member is provided on one face of the clapper and is so arranged with respect thereto as to assist in the opening of the valve, thus, alleviating the pressure loss of the fluid stream which would otherwise be encountered in the opening of a valve. The counterbalance member is of an air foil configuration for reducing any restriction of the counterbalance member to the fluid flow at a minimum when the counterbalance vane is disposed within the flow stream in the open position of the valve.

The counterbalance of the present invention is internally disposed within the valve body and one particular advantage of this feature is that most pipe lines or fluid flow systems are buried in the earth at a depth below the frost line, making access to the valve and its related parts somewhat difficult. Valves having externally mounted counterbalance devices normally require a bell hole around the buried valve in order to provide access thereto for servicing. This is an expensive procedure and is substantially eliminated with the present internal type counterbalance design, since the valve need not be accessible for repair of any outwardly extending counterbalancing devices. In addition, the counterbalance device has a stabilizing effect on the clapper member for greatly reducing clattering or fluttering thereof during operation of the valve.

It is an important object of this invention to provide a novel check valve, particularly designed and constructed for reducing the pressure drop of the fluid stream moving therethrough.

It is another object of this invention to provide a novel check valve having an internal counterbalance device for reducing the effective weight of the valve closure member for increasing the efficient operation of the valve.

Another object of this invention is to provide a novel check valve wherein fluttering or chattering of the closure member is reduced to a minimum.

A further object of this invention is to provide a novel check valve having an internal counterbalance for facilitating operation of the valve and particularly designed for reducing restriction of flow through the valve therefrom to a minimum.

Other and further objects and advantageous features of the present invention will hereinafter more fully appear in connection with the detailed description of the drawings in which:

FIGURE 3 is a view similar to FIGURE 1 depicting the valve in a closed position.

FIGURE 4 is an elevational view taken on line 4—4 of FIGURE 3.

FIGURE 5 is a sectional view taken on line 5—5 of FIGURE 3.

Figure 1:
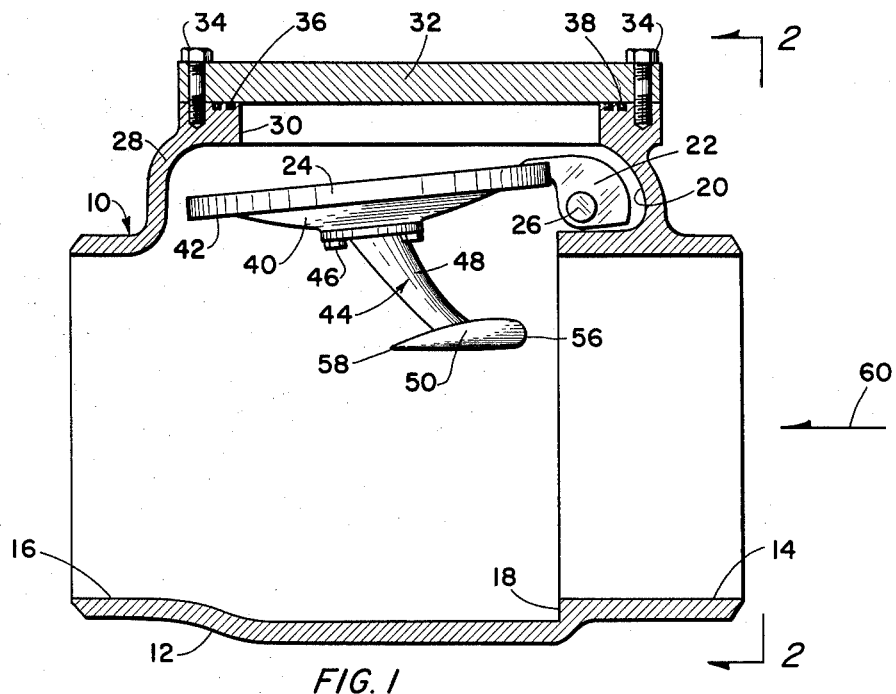
FIGURE 1 is a sectional elevational view of a valve embodying the invention and depicted in an open position.
Figure 2:
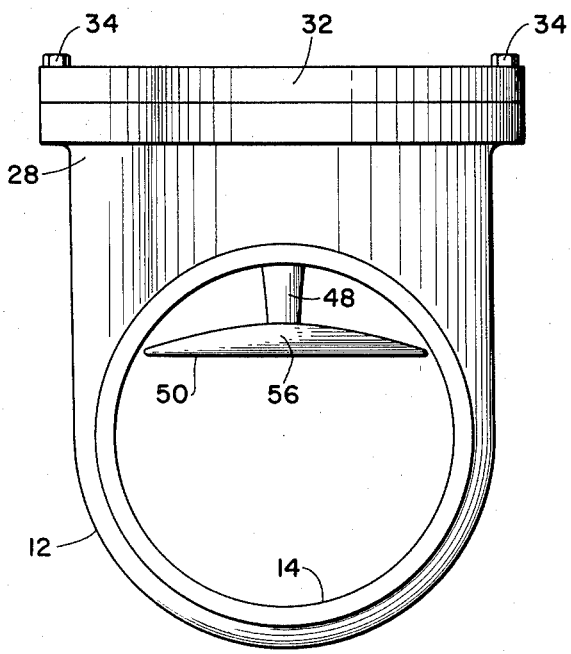
FIGURE 2 is an elevational view taken on line 2—2 of FIGURE 1.

Referring to the drawings in detail, reference character 10 refers in general to a valve comprising a substantially cylindrical body portion 12 having opposed inlet and outlet ports 14 and 16, respectively. An inwardly directed annular shoulder 18 is provided within the body in the proximity of the inlet port 14 to provide a valve seating portion. A recess 20 is provided adjacent the upper portion of the valve seat 18, as clearly shown in FIGURES 1 and 3, for receiving a shank member 22 therein. The shank member 22 may be of any suitable well known type and extends radially from a disc or clapper member 24 which cooperates with the valve seat 18 to provide alternate opened and closed positions for the valve 10. The shank 22 is pivotally secured within the recess 20 by means of a suitable transversely extending pivot shaft 26 secured within the recess 20 in any well known manner. It is to be noted that the axis of the pivot shaft 26 is offset with respect to the longitudinal center line of the disc 24 whereby a preponderance of weight of the clapper will be provided tending to urge the disc 24 toward a closed position adjacent the valve seat 18.

An upwardly extending bonnet portion 28 is provided on the body 12 and is provided with an access port 30 in order to permit access to the interior of the valve. A suitable cover plate 32 is removably secured to the bonnet 28 in any suitable manner, such as by a plurality of spaced bolts 34, for closing the access port 30. It will be apparent that a plurality of concentrically disposed sealing members 36 and 38 may be interposed between the cover 32 and the bonnet portion 28 for precluding leakage of fluid therebetween.

The disc or clapper member 24 may be of any suitable configuration and as shown herein the right hand surface thereof, as viewed in FIGURES 1 and 3, is convex or arcuate in configuration, as shown at 40, with an annular shoulder portion 42 extending circumferentially therearound for engaging the valve seat 18 in the closed position of the valve 10. It will be apparent that a sealing ring, or the like (not shown) may be disposed on either the valve seat 18 or annular shoulder 42 for facilitating sealing of the valve in the closed position. A counterbalance member, generally indicated at 44, is secured to the convex portion 40 in any suitable manner, such as by a plurality of bolts 46 and is preferably secured substantially to the center of the clapper member 24, as clearly shown in the drawings.

The counterbalance member 44 comprises an angular or slightly arcuate arm portion 48, which extends outwardly from the convex portion 40 and at an angle with respect to the plane of the disc 24. A counterbalance vane member 50 is secured to the outer extremity of the arm 48 and is properly proportioned with regard to the weight of the particular valve clapper 24 in order to counterbalance the weight of the clapper sufficiently for reducing the effective weight thereof, as will be hereinafter set forth in detail. It is to be noted that the overall dimensions of the arm 48 and vane 50 are such that the vane 50 does not engage or come into contact with the inner periphery of the body 12. Furthermore, the pivot axis of the clapper 24 is interposed between the clapper or disc itself and the vane 50, thus assuring an efficient counterbalancing action.

Referring now to FIGURE 3, it will be apparent that the arm 48 extends outwardly and upwardly from the convex portion 40 in the closed position of the valve. The vane member 50 is thus disposed in a substantially upright position and is oppositely disposed from the axis of the pivot pin 26 with respect to the disc 24, as hereinbefore set forth. Thus, the vane 50 will constantly tend to urge the clapper in a clockwise rotational direction about the pivot pin, as viewed in the drawings. The counterweight member 44 is so designed and arranged with respect to the disc 24 that there will be no interference or undesirable disturbing of the clapper in the closed position thereof. However, as soon as the clap- per 24 begins to open the weight of the vane 50 counterbalancing the weight of the disc 24, greatly facilitates the opening of the clapper and relieving the force required by the fluid stream during the opening operation.

Referring now to FIGURE 1, in the full open position of the valve 10 the arm 48 and vane 50 will extend into the flow stream moving through the valve. In order to reduce the resistance of the counterbalance device 44 to the stream moving through the valve, the arm 48 is of an air foil configuration, as shown best in FIGURE 5. In this opened position of the valve, the leading edge 52 of the arm 48 will be disposed in the flow stream whereby the fluid moving through the valve will first come in contact with the leading edge portion 52. The tapered configuration of the trailing edge 54 functions in much the same manner as the trailing edge of an aircraft wing for providing a minimum of disturbance for the fluid stream moving around the arm 48. The vane 50 is similarly of a substantially air foil configuration wherein the leading edge 56 thereof received the first impinging of the fluid stream and the trailing edge 58 facilitates the moving of the fluid around the vane 50 in the opened position of the valve.

Operation

The valve 10 may be installed within a pipe line or flow line system (not shown) in any well known manner, such as by welding therein or by the use of suitable flanged fittings. The direction of flow through the valve 10 is preferably in a direction from right to left, as viewed in the drawings and as indicated by the arrows 60 in FIGURES 1 and 3. When the pressure of the flow stream is less than that required for opening or pivoting of the clapper 24 about the pin 26, the vane 50 will tend to move downwardly by gravity, thus, facilitating the opening of the clapper. The action of the vane 50 reduces the effective weight of the clapper thereby reducing the force required by the flow stream for opening of the valve. As a result, it is found that the pressure drop of the fluid stream moving through the valve 10 is greatly reduced.

With the valve in the opened position, as shown in FIGURE 1, the vane 50 and arm 48 will extend downwardly into the path of the moving fluid stream. The air foil configuration of both the arm 48 and vane 50 is particularly designed for producing a minimum of resistance to the flow stream passing therearound. In addition, the counterweight vane 50 functions to stabilize the clapper 24 in the open position for greatly reducing any fluttering action thereof.

From the foregoing, it will be apparent that the present invention provides a novel internally counterbalanced check valve, particularly designed and constructed for reducing the pressure drop of the fluid stream moving through the valve. The counterbalance device is so arranged as to reduce the effective weight of the clapper member, thus reducing the force required by the fluid stream for opening of the valve. In addition, the counterweight device stabilizes the clapper member in the open position of the valve for reducing fluttering action of the clapper. The counterbalance device is of an air foil configuration for reducing the resistance to the fluid flow to a minimum in the opened position of the valve. The novel valve is simple and efficient in operation and economical and durable in construction.

Whereas, the present invention has been described in particular relation to the drawings attached thereto, it should be understood that other and further modifications, apart from those shown or suggested herein, may be made within the spirit and scope of this invention.

What is claimed is:

1. A check valve comprising a body having opposed inlet and outlet ports, a valve seat provided in the proximity of said inlet port, a closure member pivotally secured in the body in the proximity of the valve seat for cooperation therewith to provide alternate opened and closed positions for the valve, a counterbalance member secured to the closure member on the face thereof associated with the inlet port during the closed position of the valve, said counterbalance member comprising an angularly disposed arm member having a counterbalance vane member secured adjacent the outer extremity thereof, said counterbalance vane member being so arranged with respect to the closure member as to reduce the effective weight of the closure member whereby fluid pressure required for opening thereof is reduced during operation of the valve.

2. A check valve as set forth in claim 1 wherein the arm member and counterbalance vane are of an air foil configuration for facilitating flow of fluid through the valve in the opened position thereof.

3. A check valve comprising a body having opposed inlet and outlet ports, a valve seat provided in the body in the proximity of the inlet port, a clapper member provided within the body for cooperation with the valve seat to provide alternate opened and closed positions for the valve, pivot means provided in the body for pivotally securing the closure member in the proximity of the valve seat whereby the pivotal axis of the clapper member is offset from the longitudinal center of said clapper member, a counterbalance device carried by one face of the clapper member and extending outwardly therefrom at an angle and in a direction toward the pivot axis thereof, said counterbalance device including a vane member on the outer extremity thereof and disposed oppositely from the clapper member with regard to the pivot axis thereof whereby the effective weight of the clapper is reduced whereby fluid pressure required for opening thereof during operation of the valve is reduced.

4. A check valve as set forth in claim 3 wherein said vane member is of an air foil configuration for reducing a restriction of flow of fluid through the valve in the opened position thereof.

5. A check valve comprising a body having opposed inlet and outlet ports, an annular shoulder provided within the body in the proximity of the inlet port to provide a valve seat, a clapper member disposed within the body, a radially extending shank provided on the clapper, a recess in the body in the proximity of the valve seat for receiving the shank, a transversely extending pivot pin extending through the recess for journalling the shank therein and providing an offset axis of rotation for the clapper member, a counterbalance device secured to one face of the clapper member and extending outwardly therefrom in the direction of the axis of rotation thereof to reduce the effective weight of the clapper member whereby fluid pressure required for opening thereof during operation of the valve is reduced, said counterbalance device comprising an arcuate arm member secured to the said one face of the clapper member and extending outwardly therefrom at an angle, and a counterbalance vane member secured to the outer extremity of the arm for counterbalancing the weight of the clapper member and reducing any fluttering action thereof during operation of the valve.

6. A check valve comprising a body having opposed inlet and outlet ports, a valve seating portion provided in the body in the proximity of the inlet port, a clapper member disposed within the body for cooperation with the valve seating portion to provide alternate open and closed positions for the valve, a radially extending shaft provided on the clapper member and pivotally secured within the body adjacent the valve seating portion to provide an offset axis of rotation for the clapper member, a counterbalance device secured to one face of the clapper member and comprising an arcuate arm member secured substantially in the center of the said one face of the clapper member and extending outwardly therefrom at an angle and in a direction toward the inlet port, a counterbalance vane member secured on the outer extremity of the arm member and disposed on the opposite side of the pivot axis with respect to the clapper member for reducing the effective weight of the clapper member whereby fluid pressure required for opening thereof during operation of the valve is reduced.

7. A check valve as set forth in claim 6 wherein the arm member and counterbalance vane are of an air foil configuration to reduce restriction to a flow stream moving through the valve in the open position thereof.

References Cited in the file of this patent

UNITED STATES PATENTS

| | | |
|---|---|---|
| 651,964 | Codd | June 19, 1900 |
| 1,572,687 | Schmelz | Feb. 9, 1926 |
| 2,048,088 | Wagner | July 21, 1936 |
| 2,546,219 | Field | Mar. 27, 1951 |
| 2,557,210 | Viola | June 19, 1951 |
| 2,737,879 | Cooke | Mar. 13, 1956 |
| 2,864,401 | Carr | Dec. 16, 1958 |
| 3,075,547 | Scaramucci | Jan. 29, 1963 |

FOREIGN PATENTS

| | | |
|---|---|---|
| 545,879 | Germany | Mar. 9, 1932 |